United States Patent
Zhao et al.

(10) Patent No.: US 11,797,145 B2
(45) Date of Patent: Oct. 24, 2023

(54) SPLIT-SCREEN DISPLAY METHOD, ELECTRONIC DEVICE, AND COMPUTER-READABLE STORAGE MEDIUM

(71) Applicant: BOE Technology Group Co., Ltd., Beijing (CN)

(72) Inventors: Zhenyan Zhao, Beijing (CN); Liping Lei, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/772,963

(22) PCT Filed: May 28, 2021

(86) PCT No.: PCT/CN2021/096930
§ 371 (c)(1),
(2) Date: Apr. 28, 2022

(87) PCT Pub. No.: WO2021/244443
PCT Pub. Date: Dec. 9, 2021

(65) Prior Publication Data
US 2022/0391047 A1 Dec. 8, 2022

(30) Foreign Application Priority Data
Jun. 4, 2020 (JP) .................. 202010499515.6

(51) Int. Cl.
*G06F 3/0481* (2022.01)
*G06F 3/04845* (2022.01)
*G06F 3/04886* (2022.01)

(52) U.S. Cl.
CPC ........ *G06F 3/0481* (2013.01); *G06F 3/04845* (2013.01); *G06F 3/04886* (2013.01); *G06F 2203/04803* (2013.01)

(58) Field of Classification Search
CPC ........ G06F 21/84; G06F 3/04883; G06F 3/14; G06F 3/0481; G06F 3/0482;
(Continued)

(56) References Cited

U.S. PATENT DOCUMENTS

2012/0289290 A1\* 11/2012 Chae ............... G06F 3/0488
455/566
2015/0121278 A1\* 4/2015 Kim ............... H04M 1/724
715/771
(Continued)

FOREIGN PATENT DOCUMENTS

CN 106909297 A 6/2017
CN 108205430 A 6/2018
(Continued)

OTHER PUBLICATIONS

CN110471725A (Xu et al.), published on Nov. 19, 2019.\*
CN202010499515.6 first office action.
CN202010499515.6 second office action.

*Primary Examiner* — Rinna Yi
(74) *Attorney, Agent, or Firm* — IPRO, PLLC

(57) ABSTRACT

Provided is a split-screen display method. The electronic device displays a first interface, and the first interface includes a first window and a second window. The first window displays a first application interface. The second window displays a second application interface. The first application interface belongs to a first application. The second application interface belongs to a second application. The first interface further displays a first control. In response to a trigger operation on the first control, the electronic device executes a control instruction triggered by the first control under the trigger operation via the second application.

10 Claims, 6 Drawing Sheets

(58) Field of Classification Search
CPC ............. G06F 3/04845; G06F 3/04886; G06F 2203/04803; G09G 5/14; G09G 2354/00
See application file for complete search history.

(56) References Cited

U.S. PATENT DOCUMENTS

| | | | |
|---|---|---|---|
| 2015/0268804 A1* | 9/2015 | Hwang | G11B 27/105 715/719 |
| 2018/0020090 A1 | 1/2018 | Liu et al. | |
| 2019/0065031 A1* | 2/2019 | Kang | G06F 3/0482 |
| 2022/0147228 A1 | 5/2022 | Yi et al. | |

FOREIGN PATENT DOCUMENTS

| | | |
|---|---|---|
| CN | 108829327 A | 11/2018 |
| CN | 110427136 A | 11/2019 |
| CN | 110471639 A | 11/2019 |
| CN | 110471725 A | 11/2019 |
| CN | 111651116 A | 9/2020 |
| JP | 2015135575 A | 7/2015 |

* cited by examiner

SPLIT-SCREEN DISPLAY METHOD, ELECTRONIC DEVICE, AND COMPUTER-READABLE STORAGE MEDIUM

CROSS-REFERENCE TO RELATED APPLICATION

The present disclosure is a national phase application based on PCT/CN2021/096930, field on May 28, 2021, which claims priority to Chinese Patent Application No. 202010499515.6, filed on Jun. 4, 2020 and entitled "SPLIT-SCREEN INTERACTION METHOD, ELECTRONIC DEVICE, and COMPUTER STORAGE MEDIUM," the contents of which are incorporated herein by reference in their entireties.

TECHNICAL FIELD

The present disclosure relates to the field of computer technologies, and more particularly, relates to a split-screen display method, and an electronic device and a computer-readable storage medium thereof.

BACKGROUND

With the increase of the size of touch screens of various electronic devices, a plurality of application programs simultaneously needs to be frequently opened. At present, interfaces of multiple application programs may be simultaneously displayed on a display interface of an electronic device in a split-screen display fashion.

SUMMARY

Embodiments of the present disclosure provide a split-screen display method, and an electronic device and a computer-readable storage medium thereof.

In one aspect, a split-screen display method applicable to an electronic device is provided. The method includes:
  displaying a first interface; wherein the first interface includes a first window and a second window, the first window displaying a first application interface, the second window displaying a second application interface, the first application interface belonging to a first application, and the second application interface belonging to a second application; and the first interface further displays a first control; and
  executing, in response to a trigger operation on the first control, a control instruction triggered by the first control under the trigger operation via the second application.

Optionally, the first control is displayed in the first window.

Optionally, prior to executing, in response to the trigger operation on the first control, the control instruction triggered by the first control under the trigger operation via the second application, the method further includes:
  switching, in response to a manipulate operation triggered on the second application interface, the second application interface in the second window to a third application interface and displaying the third application interface, the third application interface belonging to the second application; and
  executing, in response to the trigger operation on the first control, the control instruction triggered by the first control under the trigger operation via the second application includes:
  switching, in response to the trigger operation on the first control, the third application interface in the second window to the second application interface and displaying the second application interface.

Optionally, the second application interface displays a play control for a media file; and switching, in response to the manipulate operation triggered on the second application interface, the second application interface in the second window to the third application interface and displaying the third application interface includes:
  switching, in response to a trigger operation on the play control, the second application interface in the second window to the third application interface and displaying the third application interface, the third application interface being a play interface corresponding to the media file.

Optionally, the method further includes: displaying a play controlling control in the first window in response to the trigger operation on the play control, the play controlling control being configured to control the media file played in the second window.

Optionally, the first application is an electronic whiteboard application, and the second application is a rich-media file management application.

Optionally, the first window further displays a second control; and the method further includes:
  exchanging the position of the first window with the position of the second window in response to a trigger operation on the second control.

Optionally, the first window further displays a third control; and the method further includes:
  displaying an application interface of the first application in a full-screen fashion in response to a trigger operation on the third control.

Optionally, the first interface further displays a fourth control; and the method further includes:
  adjusting a window size ratio of the first window to the second window in response to a drag operation on the fourth control.

Optionally, the fourth control is disposed between the first window and the second window.

Optionally, prior to displaying the first interface, the method further includes:
  displaying a second interface, the second interface displaying the first application interface and at least one fifth control; and
  displaying the first interface includes:
  switching, in response to a trigger operation on the fifth control, the second interface to the first interface and displaying the first interface.

Optionally, the fifth control displayed on the second interface includes at least one of the following: a fifth control displayed in a left region of the second interface, a fifth control displayed in a right region of the second interface, a fifth control displayed in an upper region of the second interface, and a fifth control displayed in a lower region of the second interface;
  in the case that the trigger operation on the fifth control is a trigger operation on the fifth control displayed in the left region of the second interface, the second window in the first interface is disposed on the left side of the first window;
  in the case that the trigger operation on the fifth control is a trigger operation on the fifth control displayed in the right region of the second interface, the second window in the first interface is disposed on the right side of the first window; or in the case that the trigger operation on the fifth control is a trigger operation on the fifth control displayed in the upper region of the second interface, the second window in the first interface is disposed on the upper side of the first window; or in the case that the trigger operation on the fifth control is a trigger operation on the fifth control displayed in the lower region of the second interface, the second window in the first interface is disposed on the lower side of the first window.

In another aspect, an electronic device is provided. The electronic device includes:

a displaying module, configured to display a first interface; wherein the first interface comprises a first window and a second window, the first window displaying a first application interface, the second window displaying a second application interface, the first application interface belonging to a first application, and the second application interface belonging to a second application; and the first interface further displays a first control; and a processing module, configured to, execute, in response to a trigger operation on the first control, a control instruction triggered by the first control under the trigger operation via the second application.

Optionally, the processing module is further configured to control, in response to a manipulate operation triggered on the second application interface, the displaying module to switch the second application interface in the second window to a third application interface and display the third application interface, the third application interface belonging to the second application; and the processing module is further configured to control, in response to the trigger operation on the first control, the displaying module to switch the third application interface in the second window to the second application interface and display the second application interface.

Optionally, the second application interface displays a play control for a media file; and the processing module is configured to control, in response to a trigger operation on the play control, the displaying module to switch the second application interface in the second window to the third application interface and display the third application interface, the third application interface being a play interface corresponding to the media file.

Optionally, the displaying module is further configured to display a play controlling control in the first window in response to the trigger operation on the play control, the play controlling control being configured to control the media file played in the second window.

Optionally, the first window further displays at least one of a second control, a third control and a fourth control;

the processing module is further configured to exchange the position of the first window with the position of the second window in response to a trigger operation on the second control;

the displaying module is further configured to display an application interface of the first application in a full-screen fashion in response to a trigger operation on the third control; and the processing module is further configured to adjust a window size ratio of the first window to the second window in response to a drag operation on the fourth control.

Optionally, the displaying module is further configured to display a second interface, the second interface displaying the first application interface and at least one fifth control; and the processing module is further configured to control, in response to a trigger operation on the fifth control, the displaying module to switch the second interface to the first interface and display the first interface.

In another aspect, an electronic device is provided. The electronic device includes a processor and a memory; wherein the memory is configured to store one or more computer programs including one or more program instructions therein; and the processor, when loading and running the one or more computer program, is caused to perform the split-screen display method according to any one of the aspects.

In still another aspect, a computer-readable storage medium storing one or more instructions therein is provided, wherein the one or more instructions, when loaded and executed by a processor of an electronic device, cause the electronic device to perform the split-screen display method according to any one of the aspects.

DETAILED DESCRIPTION

Figure 1:
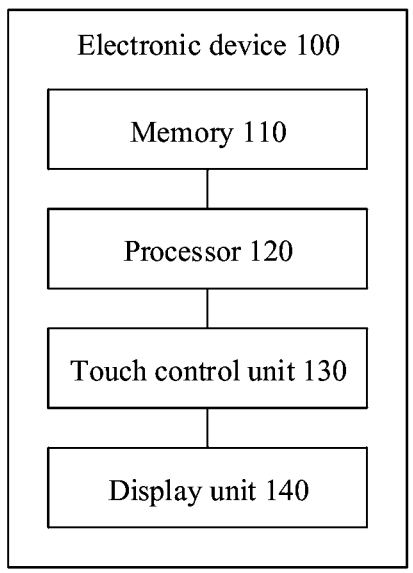
FIG. 1 is a block diagram of a hardware structure of an electronic device according to an embodiment of the present disclosure.

For clearer descriptions of the present disclosure, the present disclosure is further described below with reference to the embodiments and accompanying drawings. Similar parts in the accompanying drawings are represented by the same reference numerals. Those skilled in the art should understand that the content specifically described below is illustrative and not restrictive, and should not be constructed as limiting the protection scope of the present disclosure.

In the description of the embodiments of the present disclosure, unless otherwise stated, the symbol "/" indicates an "or" relationship, for example, A/B may mean A or B. The term "and/or" merely describes association relationships among associated objects, and may indicate three relationships. For example, "A and/or B" may indicate that A exists alone, or A and B exist simultaneously, or B exists alone.

The terms "first" and "second" below are only for the purpose of description and should not be construed as indicating or implying relative importance or implicitly indicating the number of technical features indicated. Thus, the features defined by the terms "first" and "second" may include one or more of the features either explicitly or implicitly. In the description of the embodiments of the present disclosure, unless otherwise stated, the term "a plurality of" means two or more.

In the embodiments of the present disclosure, the term "in an/another exemplary embodiment" or "for example" or the like are configured to represent examples, illustrations or descriptions. Any embodiments or design solutions described in the embodiments of the present disclosure as "in an/another exemplary embodiment" or "for example" should not be interpreted as being more preferable or advantageous than other embodiments or designs. Exactly, the term "in an/another exemplary embodiment" or "for example" is intended to present related concepts in a specific manner.

In an exemplary embodiment, an electronic device in the present disclosure may be an electronic whiteboard device, a smart TV, a mobile phone, a tablet computer, a personal computer (PC), a personal digital assistant (PDA), a smart watch, a netbook computer, a wearable electronic device, an augmented reality (AR) device, a virtual reality (VR) device, an in-vehicle device, a smart car, a robot, or the like. The specific form of the electronic device is not particularly limited in the present disclosure.

FIG. 1 is a block diagram of a hardware structure of an electronic device according to an embodiment of the present disclosure. As shown in FIG. 1, the electronic device 100 includes a memory 110 and a processor 120. It should be understood that components of the electronic device 100 shown in FIG. 1 are exemplary only and not restrictive. According to actual needs, the electronic device 100 may be further provided with other components. Optionally, the electronic device 100 may adopt an operating system such as Windows or Android.

The memory 110 is configured to store one or more computer-readable instructions in a non-transitory fashion. The processor 120 is configured to load and execute the one or more computer-readable instructions stored in the memory 110.

Optionally, as shown in FIG. 1, the electronic device 100 further includes a touch control unit 130. The touch control unit 130 is configured to detect a touch operation on a working surface of the touch control unit 130. For example, the touch control apparatus 130 may include any input apparatus having a touch control function, such as an electronic pen, a touch screen, a mouse, a touch pad or an interactive whiteboard. Herein, the touch screen may be a capacitive touch screen, a self-capacitive touch screen or a mutual-capacitive touch screen, and may also be a resistive touch screen, a surface acoustic wave touch screen, an infrared touch screen, or the like.

For example, the touch control unit 130 may include a touch sensor and a controller, e.g., a driver integrated circuit (IC). The controller is configured to receive an electrical signal captured by a touch sensor, acquire a touch signal by processing the electrical signal, and provide the touch signal to the processor for further processing. The embodiments of the present disclosure do not limit the types, structures, communications or the like of the touch control unit 130. The touch control unit 130 includes a working surface of a certain area. A user can write directly on the working surface of the touch control unit 130 with his/her finger, or write on the working surface of the touch control unit 130 with an active stylus or a passive stylus, which is not limited in the embodiments of the present disclosure. Herein, the working surface refers to a surface for detecting a user's touch operation, such as a touch surface of the touch control unit 130.

Optionally, as shown in FIG. 1, the electronic device 100 further includes a display unit 140. The display unit 140 is configured to display an interactive interface. For example, the display unit 140 may include a display screen, a projector or the like. The display screen of the display unit 140 may be a liquid crystal display (LCD) screen, an organic light-emitting diode (OLED) display screen, a quantum dot light-emitting diode (QLED) display screen, a projection assembly, a VR head-mounted display device (such as a VR helmet or VR glasses), an AR display device, or the like, which is not limited in the embodiments of the present disclosure.

In some embodiments, the touch control unit 130 and the display unit 140 may be integrated into a touch control display screen having both a touch control function and a display function.

Optionally, the memory 110 and the processor 120 may be integrated in the touch control display screen; or the memory 110 and the processor 120 may be integrated in a cloud server.

Optionally, the electronic device 100 further includes a communication module, via which the electronic device 100 can communication with other electronic devices. For example, when the electronic device 100 is applicable to a conference room, the communication module may transmit an interactive interface displayed by the electronic device 100 to a mobile phone or a tablet computer of a user who remotely participates in the conference, such that the mobile phone or tablet computer can display the interactive interface displayed on the electronic device 100.

Optionally, the processor 120 may control other components in the electronic device 100 to execute desired functions. The processor 120 may be a device with data processing capability and/or program execution capability, such as a central processing unit (CPU), and a tensor processing unit (TPU). The CPU may adopt an X86 architecture, an advanced RISC machine (ARM) architecture, or the like.

Optionally, the memory 110 may include any combination of one or more computer program products. The computer program product may include various forms of computer-readable storage media. The memory 110 may include a volatile memory and/or a non-volatile memory. Optionally, the volatile memory includes a random-access memory (RAM) and/or a cache. The non-volatile memory includes a read-only memory (ROM), a hard disk, an erasable programmable ROM (EPROM), a portable compact disc ROM (CD-ROM), a universal serial bus (USB) memory, a flash memory, or the like. One or more computer-readable instructions may be stored in the computer-readable storage medium; and the processor 120, when loading and executing the one or more computer-readable instructions, is caused to implement various functions of the electronic device 100.

Optionally, components such as the memory 110, the processor 120, the touch control unit 130, and the display unit 140 may communicate with one another over a network. The network may be a wireless network, a wired network, or a combination of the wireless network and the wired network. For example, the network may be a local area network, internet, telecommunication network, Internet of things (IoT) based on the internet and/or telecommunication network, and/or any combination of the above networks. Herein, the wired network may be implemented by a twisted-pair wire, a coaxial cable, or an optical fiber. The wireless network may be implemented by a 3G/4G/5G mobile communication network, Bluetooth, Zigbee network, Wi-Fi, or the like. The present disclosure does not limit the type and function of the network for implementing the communication among the various components in the electronic device 100.

Figure 2:
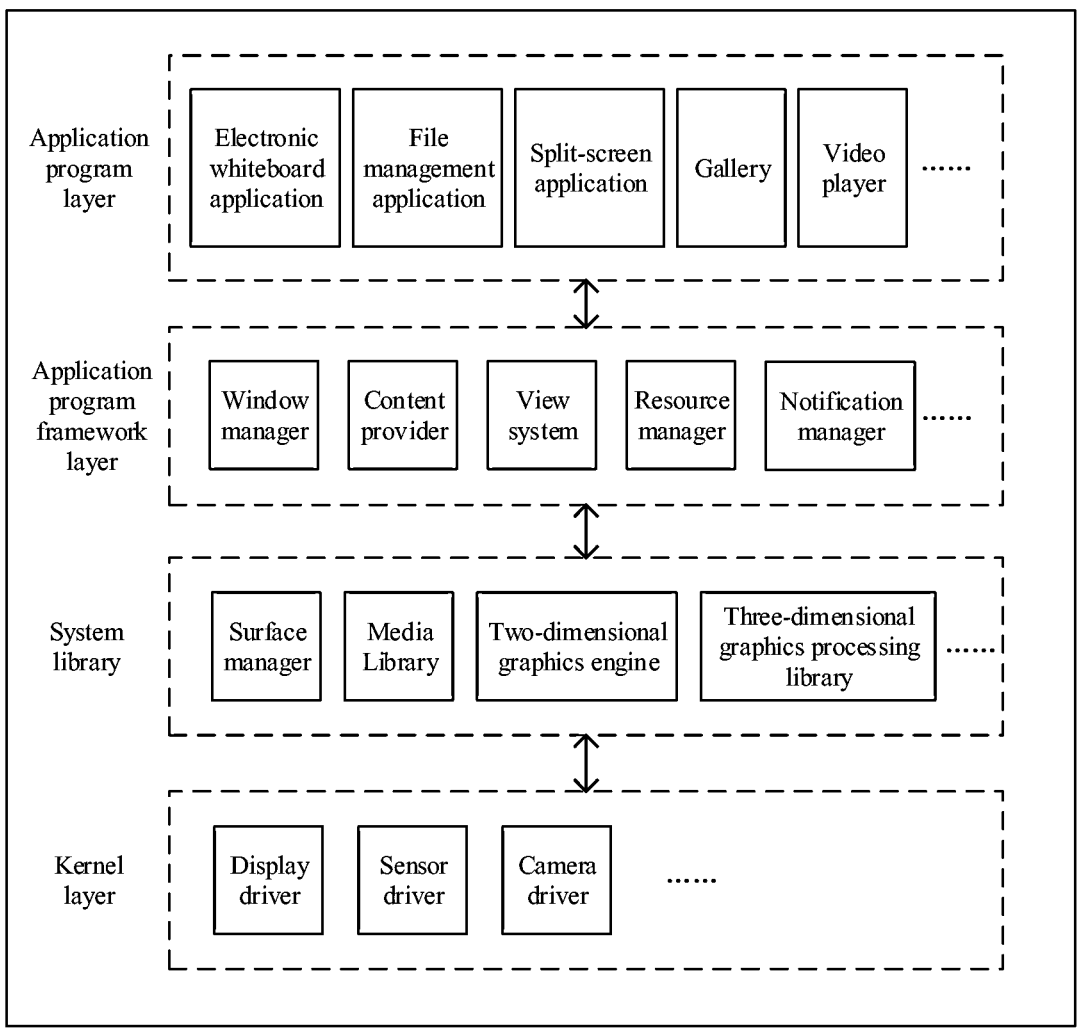
FIG. 2 is a block diagram of a software structure of an electronic device according to an embodiment of the present disclosure.

The software system of the electronic device 100 may adopt a layered architecture, an event-driven architecture, a microkernel architecture, a microservice architecture, or a cloud architecture. In the embodiments of the present disclosure, a scenario where the software system of the electronic device 100 adopts the Android system using the layered architecture is taken as an example for description. For example, FIG. 2 is a block diagram of a software structure of an electronic device according to an embodiment of the present disclosure. In the layered architecture, the software is divided into several layers, each of which has a clear role and specialization. The layers communicate with one another via software interfaces. In some embodiments, the Android system may be divided into four layers, as shown in FIG. 2, which are, from top to bottom, an application program layer, an application program framework layer, a system library, and a kernel layer.

The application program layer may include a series of application program packages. As shown in FIG. 2, the application program package may include an electronic whiteboard application, a rich-media file management application, a split-screen application, a gallery, a video player, and the like. The application program package may further include application programs such as camera, calendar, calling, map, navigation, WLAN, Bluetooth, and/or music. In some embodiments of the present disclosure, the split-screen application may provide an interface allowing the electronic device 100 to interact with a user in a split-screen mode. In another exemplary embodiment, the split-screen mod may be implemented based on a free window layout of FreeForm supported by Android.

The application program framework layer provides an application programming interface (API) and a programming framework for application programs in the application program layer. The application program framework layer includes some predefined functions. As shown in FIG. 2, the application program framework layer may include a window manager, a content provider, a view system, a resource manager, a notification manager, and the like.

Herein, the window manager is configured to manage window programs, and has functions such as acquiring the size of a display screen, judging whether there is a status bar in a window, locking the screen, and screenshotting the screen. In some embodiments of the present disclosure, the window manager may be a window management service (WMS). The WMS stores information of each application window displayed on the current screen, such as the number of application windows displayed on the current screen. The split-screen application may determine the size and the position of each window based on the number of the application windows displayed on the current screen. In the embodiment of the present disclosure, the window manager may implement an exchange layout function supporting a split screen, that is, only the display positions of the two windows are exchanged, without changing the display relationship between the two windows.

The content provider is configured to store and acquire data, and enable these data accessible to application programs. These data may include video data, image data, audio data, calls made and received, browsing history, bookmarks, and/or contacts.

The view system includes a visible control, such as a control that displays texts or a control that displays pictures, and may be configured to build an application program. The display interface may be composed of one or more views. For example, the display interface including short message notification icons may include a view in which the texts are displayed and a view in which the pictures are displayed.

The resource manager is configured to provide various resources for the application programs, such as, localized character strings, icons, pictures, layout files, and video files.

The notification manager enables application programs to display notification information in the status bar, may be configured to convey a notification-type message, and may further enable a displayed message to disappear automatically after a short stay without user interaction. For example, a notification manager may be configured to notify a reminder of a message such as download completion, and may also display a notification, such as a notification of an application running in the background, in the status bar at the top of the system in the form of a graphic or a scroll bar text. Alternatively, the notification manager may also display a notification on the screen in the form of a dialog window, such as a text information prompt in the status bar, a beep, vibration of an electronic device, or blinks of an indicator light.

Optionally, the system library is integrated with Android runtime. The Android runtime includes a core library and a virtual machine, is responsible for the scheduling and management of the Android system. The core library includes two parts: one is a performance function that java language needs to call, and the other is the core library of Android. The application program layer and the application program framework layer run in the virtual machine. The virtual machine executes java files on the application program layer and the application program framework layer as binary files. The virtual machine is configured to implement functions such as object life cycle management, stack management, thread management, security and exception management, and garbage collection.

A system library may include a plurality of function modules. As shown in FIG. 2, the system library may include a surface manager (surface manager), media libraries, a two-dimensional graphics engine (e.g., SGL), a three-dimensional graphics processing library (e.g., OpenGL ES), and the like.

The surface manager is configured to manage the display system and provide a fusion of a two-dimensional graph layer and a three-dimensional graph layer for a plurality of applications.

The media library supports playback and recording of audios and videos in various encoding formats, as well as storage and play of still image files. For example, the audio and video encoding formats supported by the media library include one or more of MPEG4, H.264, MP3, AAC, AMR, JPG, and PNG.

The two-dimensional graphics engine is a drawing engine for two-dimensional drawings. The three-dimensional graphics processing library is configured to implement three-dimensional graphics drawing, image rendering and composition, graph layer processing, or the like.

The kernel layer is a layer between hardware and software. As shown in FIG. 2, the kernel layer includes a display driver, a sensor driver, a camera driver, and the like. The kernel layer may further include an audio driver, and the like All of the technical solutions involved in the embodiments of the present disclosure may be implemented by the electronic device 100 having the above hardware architecture and/or software architecture.

With the increase of the size of touch screens of various electronic devices, a plurality of application programs need to be simultaneously opened. Interfaces of multiple application programs can be simultaneously displayed on a display interface of an electronic device in a split-screen display fashion. At present, when a system return button of the electronic device in the split-screen mode is clicked, the system of the electronic device performs a response operation on the system return button function by default based on the software where an operation focus is. Generally, the software performs a rollback operation. Herein, the operation focus refers to the last operation of the user on the electronic device before the system return button is clicked.

In the case that the electronic device is applicable to a conference scenario, the user mainly uses the electronic whiteboard application in the electronic device to write, and accessorily uses the rich-media file management application in the electronic device to display media files such as PPTs, pictures, or videos. Since the size of the electronic device used in the conference scene is usually larger, when the user needs to operate the rich-media file management application, it is required to switch from a window displaying the electronic whiteboard application to a window displaying the rich-media file management application, which is inconvenient. In addition, in the conference scene, the system return button in the split-screen mode is generally configured to operate the rich-media file management application. However, in the case that the operation focus is on the electronic whiteboard application while the system return button is clicked, the electronic whiteboard application is triggered to perform the rollback operation by mistake. In this case, where some people are operating the electronic device at the same time in the conference scene, it is likely to cause a false response of the electronic whiteboard application due to the confusion of the operation focus, which interferes with normal writing.

Figure 3:
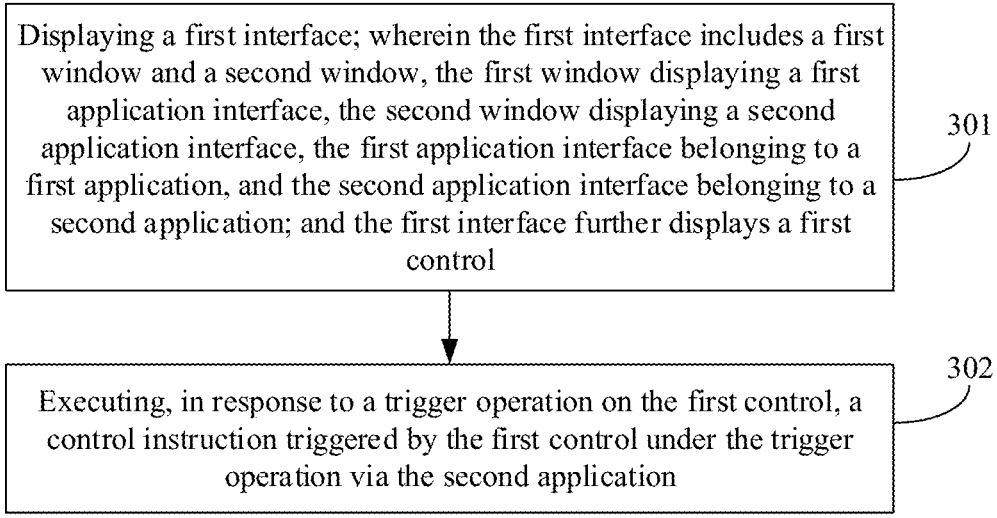
FIG. 3 is a schematic flowchart of a split-screen display method according to an embodiment of the present disclosure.

FIG. 3 is a schematic flowchart of a split-screen display method according to an embodiment of the present disclosure. The method is applicable to an electronic device. As shown in FIG. 3, the method includes the following processes.

In process 301, a first interface is displayed, wherein the first interface includes a first window and a second window; the first window displays a first application interface; the second window displays a second application interface; the first application interface belongs to a first application; the second application interface belongs to a second application; and the first interface further displays a first control.

The first control is a system control. Optionally, the first control is a return control or a rollback control, and is configured to control an application opened in the electronic device to perform a rollback operation. The rollback operation may be to undo the last operation of a user on the application or return to the previous interface.

Optionally, the first application is an electronic whiteboard application, and the second application is a rich-media file management application. Main functions of the electronic whiteboard application include: in response to a user's input operation by a finger or a device such as an active pen, displaying a text, drawing an image and displaying them on a screen. Generally, the electronic whiteboard application is used as conference software. Main functions of the rich-media file management application include: searching, opening and playing various media file resources. It can be understood that the electronic whiteboard application and the rich-media file management application are only configured to illustrate and explain the present disclosure, and are not intended to limit the present disclosure.

In process 302, in response to a trigger operation on the first control, a control instruction triggered by the first control under the trigger operation is executed via the second application.

In the split-screen display method according to the embodiment of the present disclosure, application interfaces of a plurality of applications may be displayed in a split-screen fashion on the electronic device, no matter which application the operation focus is on, a trigger operation on the first control always triggers the second application to execute a corresponding control instruction, such that a false response of the first application to the trigger operation on the first control can be avoided. Especially in a scenario where some people operate the electronic device at the same time, the false response caused by the confusion of the operation focus may be avoided, such that the response accuracy of the electronic device is improved, and the user experience is further improved.

Optionally, the first control is displayed in the first window. The first window is a main screen, and the second window is a secondary screen. The width of the first window is greater than or equal to the width of the second window. The user can control the application displayed in the second window without switching the first window to the second window. Thus, user operations are eased by optimizing the interface layout.

Figure 4:
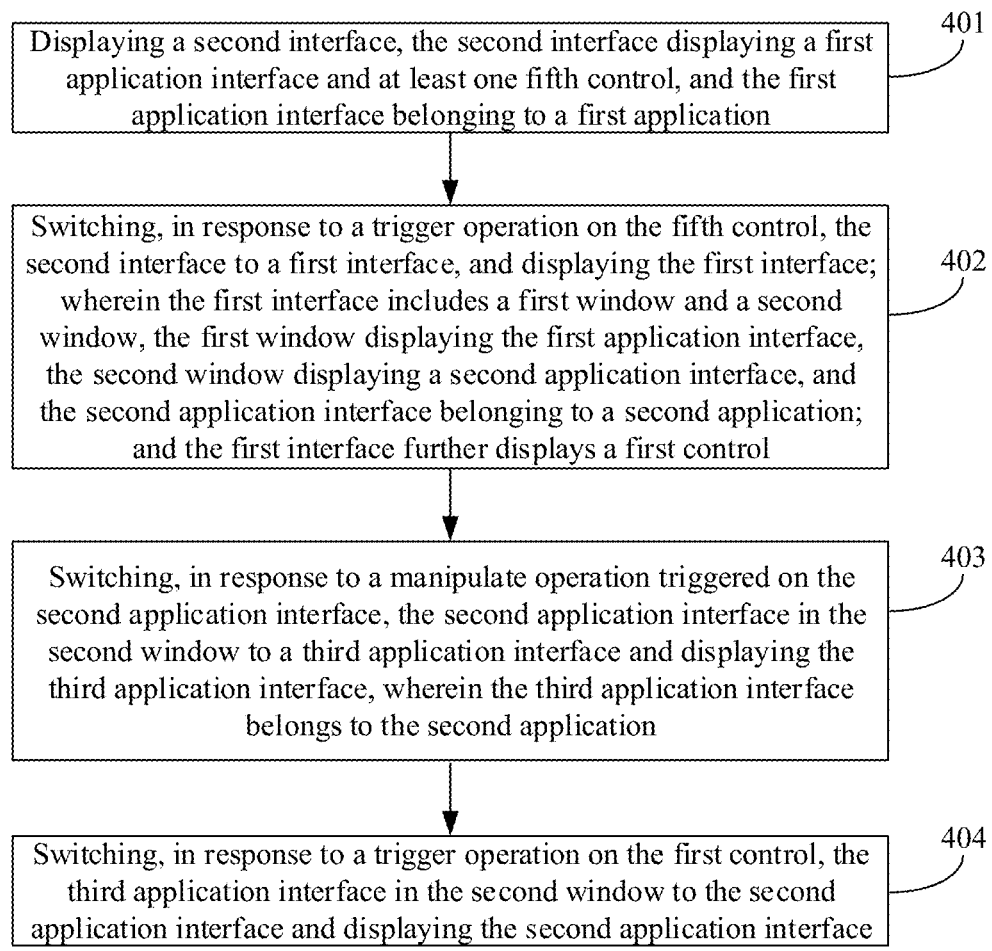
FIG. 4 is a schematic flowchart of another split-screen display method according to an embodiment of the present disclosure.

The embodiments of the present disclosure hereinafter take the first application as the electronic whiteboard application, the second application as the rich-media file management application, and the first control as a return control or a rollback control as an example to schematically illustrate an implementation process of the split-screen display method. FIG. 4 is a schematic flowchart of another split-screen display method according to an embodiment of the present disclosure. As shown in FIG. 4, the method includes the following processes.

In process 401, a second interface is displayed, wherein the second interface displays a first application interface and at least one fifth control; wherein the first application interface belongs to a first application.

The fifth control is a split-screen control. Optionally, the fifth control displayed on the second interface includes at least one of the following: a fifth control displayed in a left region of the second interface, a fifth control displayed in a right region of the second interface, a fifth control displayed in an upper region of the second interface and a fifth control displayed in a lower region of the second interface. Herein, in the case that the fifth control displayed in the left region of the second interface receives a trigger operation, a new window is additionally provided on the left side of the first application interface for split-screen display. Alternatively, after the fifth control displayed in the right region of the second interface receives the trigger operation, a new window is additionally provided on the right side of the first application interface for split-screen display. Alternatively, after the fifth control displayed in the upper region of the second interface receives the trigger operation, a new window is additionally provided on the upper side of the first application interface for split-screen display. Alternatively, after the fifth control displayed in the lower region of the second interface receives the trigger operation, a new window is additionally provided on the lower side of the first application interface for split-screen display.

Figure 5:
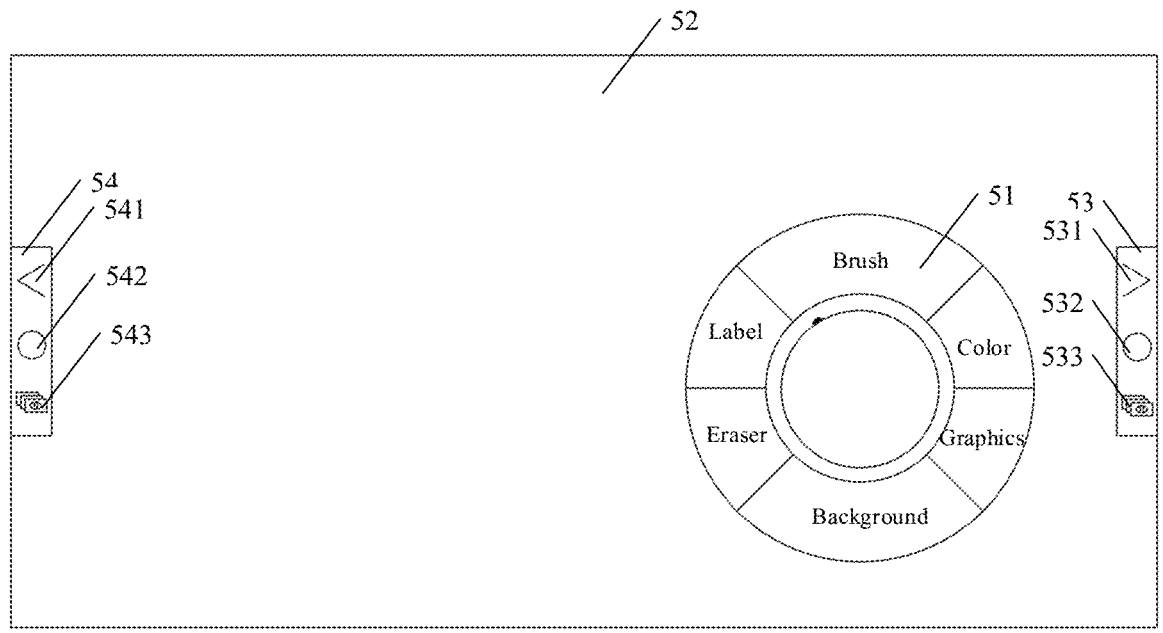
FIG. 5 is a schematic interface diagram of a second interface according to an embodiment of the present disclosure.

For example, FIG. 5 is a schematic interface diagram of a second interface according to an embodiment of the present disclosure. As shown in FIG. 5, the second interface displays an application interface of the electronic whiteboard application. The second interface includes a write set control 51, a writing region 52, a right sidebar 53 disposed in a right region of the second interface, and a left sidebar 54 disposed in a left region of the second interface. Herein, the write set control 51 is configured to allow a user to configure functions such as a writing brush type, a handwriting type and/or a handwriting color. The writing region 50 is configured to allow the user to write. The right sidebar 53 includes a return control 531, a homepage control 532 and a split-screen control 533. The left sidebar 54 includes a return control 541, a homepage control 542 and a split-screen control 543. Herein, functions of the homepage controls 532 and 542 correspond to a "home screen key" displayed on the electronic device with the Android system, and are configured to hide the application interface of the electronic whiteboard application displayed in a full-screen fashion, so as to return to a desktop interface. Functions of the return controls 531 and 541 correspond to a "backspace key" displayed on the electronic device with the Android system, and are configured to undo the last operation of the user on the electronic whiteboard application or return to the previous interface. The split-screen controls 533 and 543 are configured to enable the split-screen mode.

It can be understood that in addition to the above examples, a split-screen control disposed at the top of the screen and/or a split-screen control disposed at the bottom of the screen may also be displayed in the second interface shown in FIG. 5, such that the user can conveniently define the relative positions of the two applications after the split screen mode is enabled according to his/her needs and habits. Its specific setting method similar to that in the above example, and is repeated herein.

Figure 6:
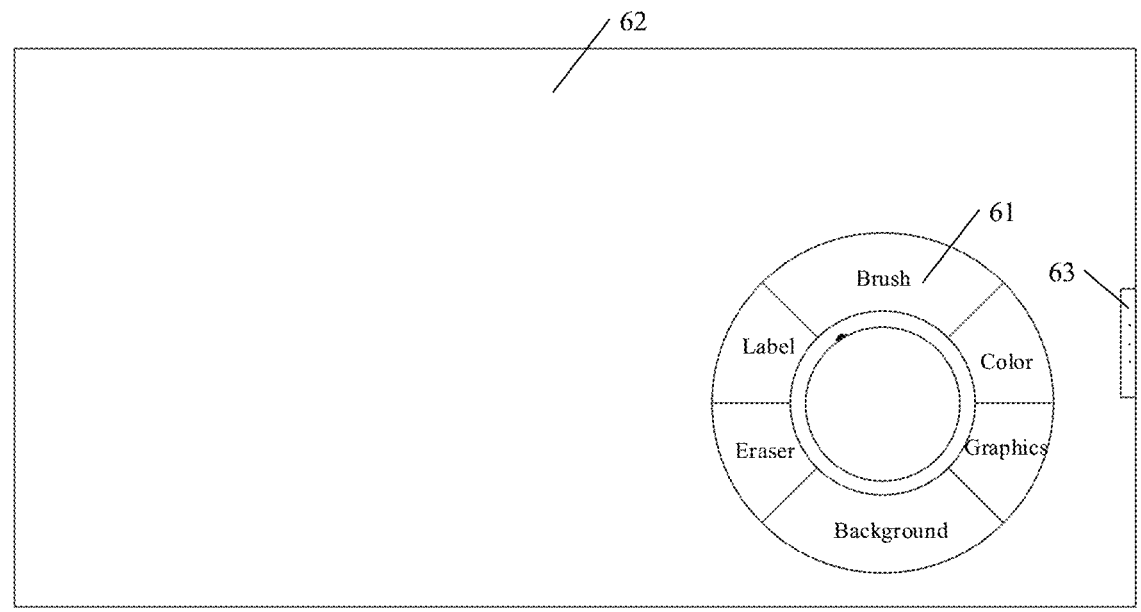
FIG. 6 is a schematic diagram of an application interface of an electronic whiteboard application according to an embodiment of the present disclosure.

After the electronic device is powered on, icons of various application programs are displayed on its desktop interface. In response to a touch operation (e.g., a touch and click by a finger) on an icon of the electronic whiteboard application, the display interface of the electronic device may be as shown in FIG. 6, that is, the application interface of the electronic whiteboard application is displayed in a full-screen fashion. FIG. 6 is a schematic diagram of an application interface of an electronic whiteboard application according to an embodiment of the present disclosure. As shown in FIG. 6, the display interface includes a write set control 61, a writing region 62 and an expansion control 63. In the display interface shown in FIG. 6, the electronic device displays the second interface shown in FIG. 5 in response to the touch operation (e.g., the touch and click by the finger) of the user on the expansion control 61, that is, the expansion control 61 is hidden and the sidebar is displayed.

In addition to the above example, the operation of unfolding the sidebar may also be performed in the following manner. The electronic device may be configured to display the interface with the right sidebar 53 and the left sidebar 54 as shown in FIG. 5 in response to a sliding operation at the edge position and a gesture interaction operation at the side position in the interface shown in FIG. 6, or a control instruction and the like sent by a remote controller cooperating with the electronic device. The embodiments of the present disclosure do not specifically limit the operation of unfolding the sidebar on the full-screen display interface.

In process 402, in response to a trigger operation on the fifth control, the second interface is switched to the first interface, and the first interface is displayed, wherein the first interface includes a first window and a second window; wherein the first window displays the first application interface, the second window displays a second application interface, and the second application interface belongs to the second application; and the first interface further displays a first control.

In the case that the electronic whiteboard application has been opened on the electronic device, in response to detecting the user performs a predefined operation of opening a split-screen mode (i.e., the trigger operation on the fifth control), the electronic device displays two windows on the same interface at the same time. One of the windows is configured to display the application interface of the opened electronic whiteboard application, and the other window is configured to display the application interface of the rich-media file management application. In some embodiments, the above predefined operation of opening the split-screen mode may be set as a touch operation on a split-screen control in the sidebar displayed on the application interface of the electronic whiteboard application.

In the embodiment of the present disclosure, the trigger operation on the fifth control may be set as an operation gesture acting on the upper, lower, left and right edge regions of the screen of the electronic device. Herein, the operation gesture may be a two-finger swiping (in up, down, left and right directions) action, a three-finger swiping (in up, down, left and right directions) action, a pressure pressing action, a large-area touch action, a long press action, or the like. Since an application interface of one application program is already displayed on the screen of the current electronic device, the operation of triggering the split-screen function can be distinguished from the gesture of operating the electronic whiteboard application by setting the trigger operation on the fifth control. In other words, the trigger operation on the fifth control in the embodiment of the present disclosure may be set as any gesture different from the operations of the user on the application program interface. The mode of opening the split-screen mode directly by a predefined relatively-special operation gesture instead of using the split-screen control can also enable the user to conveniently open the split-screen mode and customize the relative positions of the two applications upon opening the split-screen mode according to needs.

Optionally, in the case that the trigger operation on the fifth control is a trigger operation on the fifth control displayed in the left region of the second interface, the second window in the first interface is disposed on the left side of the first window. In the case that the trigger operation on the fifth control is a trigger operation on the fifth control displayed in the right region of the second interface, the second window in the first interface is disposed on the right side of the first window. In the case that the trigger operation on the fifth control is a trigger operation on the fifth control displayed in the upper region of the second interface, the second window in the first interface is disposed on the upper side of the first window. In the case that the trigger operation on the fifth control is a trigger operation on the fifth control displayed in the lower region of the second interface, the second window in the first interface is disposed on the lower side of the first window.

In the embodiment of the present disclosure, the layout of the two windows upon splitting the screen is determined based on the specific position of the split-screen control receiving the trigger operation on the display interface of the electronic device. The user can customize the relative positions of the two applications after the split-screen mode is opened according to needs, which simplifies the user operation and realizes the efficient interaction between the user and the electronic device.

Figure 7:
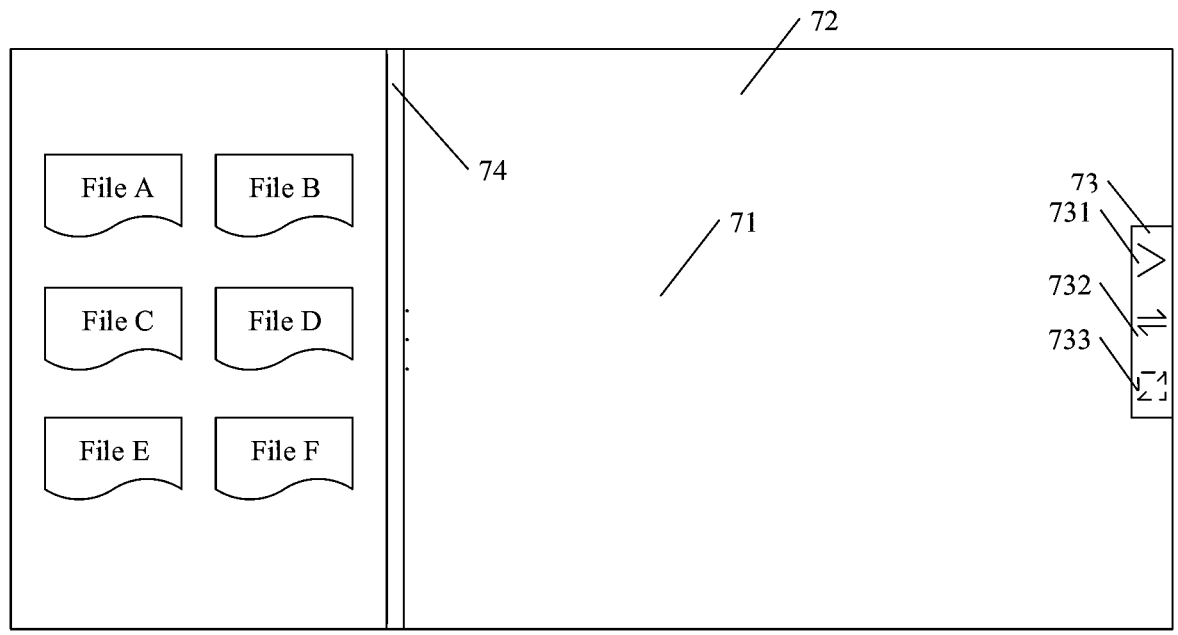
FIG. 7 is a schematic interface diagram of a first interface according to an embodiment of the present disclosure.

For example, when the user applies a touch operation (e.g., a touch and click by a finger) onto the split-screen control 543 in the left sidebar 54 shown in FIG. 5, the electronic device displays a first interface shown in FIG. 7 in response to the touch operation on the split-screen control 543. FIG. 7 is a schematic interface diagram of a first interface according to an embodiment of the present disclosure. As shown in FIG. 7, the first interface includes a first window on the right side of the screen and a second window on the left side of the screen. The first window shown in FIG. 7 displays the application interface of the electronic whiteboard application. The application interface of the electronic whiteboard application shown in FIG. 7 includes a write set control 71 and a writing region 72. The second window shown in FIG. 7 displays the application interface of the rich-media file management application. The application interface of the rich-media file management application shown in FIG. 7 is the main interface of the application program, and display file icons (for example, an icon of file A, an icon of file B, an icon of file C, an icon of file D, an icon of file E and an icon of file F) of various types and formats of media files such as documents, pictures, audios and/or videos stored in the electronic device. The file icon may be regarded as a play control for a corresponding media file. Understandably, by setting the electronic device, when opening the split-screen mode in response to the touch operation on the split-screen control 543, the electronic device can enable the rich-media file management application and display the application interface of the rich-media file management application over the second window. In addition, according to user's requirements, by changing the setting of the electronic device, another designated application program can be enabled when the split-screen mode is opened, and the application interface of the designated application program can be displayed in the second window. As shown in FIG. 7, the first window further displays a sidebar 73 in which the first control 731 is disposed. It should be noted that the interface in the split-screen mode shown in FIG. 7 hides the left sidebar in FIG. 5.

Figure 8:
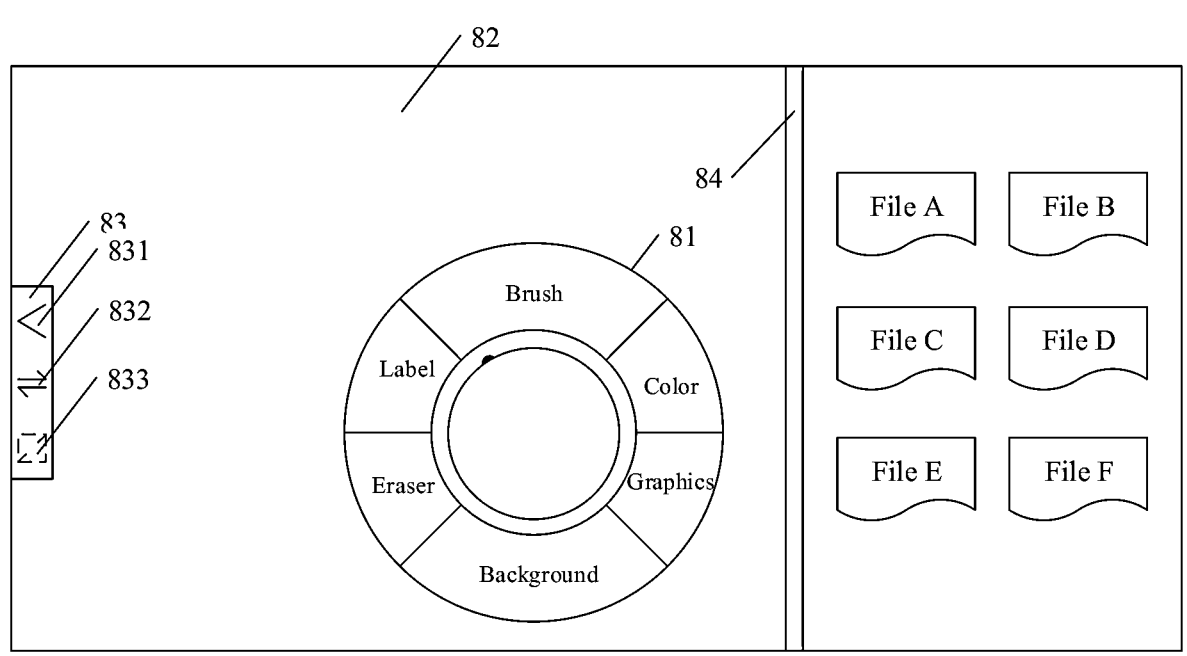
FIG. 8 is a schematic interface diagram of another first interface according to an embodiment of the present disclosure.

For another example, when the user applies a touch operation (e.g., a touch and click by a finger) onto the split-screen control 533 in the right sidebar 53 shown in FIG. 5, the electronic device displays a first interface shown in FIG. 8 in response to the touch operation on the split-screen control 533. FIG. 8 is a schematic interface diagram of another first interface according to an embodiment of the present disclosure. As shown in FIG. 8, the first interface includes a first window on the left side of the screen and a second window on the right side of the screen. The first window shown in FIG. 8 displays the application interface of the electronic whiteboard application. The application interface of the electronic whiteboard application shown in FIG. 8 includes a write set control 81 and a writing region 82. The second window shown in FIG. 8 displays the application interface of the rich-media file management application. The application interface of the rich-media file management application shown in FIG. 8 is the main interface of the application program, and display file icons (for example, an icon of file A, an icon of file B, an icon of file C, an icon of file D, an icon of file E and an icon of file F) of various types and formats of media files such as documents, pictures, audios and/or videos stored in the electronic device. The file icon may be regarded as a play control for a corresponding media file. Understandably, by setting the electronic device, when opening the split-screen mode in response to the touch operation on the split-screen control 533, the electronic device can enable the rich-media file management application and display the application interface of the rich-media file management application over the second window. In addition, according to user's requirements, by changing the setting of the electronic device, another designated application program can be enabled when the split-screen mode is opened, and the application interface of the designated application program can be displayed in the second window. As shown in FIG. 8, the first window further displays a sidebar 83 in which the first control 831 is disposed. It should be noted that the interface in the split-screen mode shown in FIG. 8 hides the left sidebar in FIG. 5.

In the case that the electronic device is switched to the split-screen mode from the full-screen mode, the display size of the write set control and content (such as a text and a graphics) written by the user in the handwriting region may be set to be reduced in equal proportion with the reduction of the size of the window displaying the application interface of the electronic whiteboard application. For example, the size of the write set control 71 in FIG. 7 (or the size of the write set control 81 in FIG. 8) is smaller than that of the write set control 51 in FIG. 5, and the size ratio between them is equal to or similar to that of the first application interface in the full-screen mode to the first application interface in the split-screen mode. Alternatively, the display size of the write set control and/or the content written by the user in the handwriting region may also be set to not change with the size change of the window displaying the application interface of the electronic whiteboard application; and corresponding controls are provided or corresponding function keys are provided in the write set control, such that the user can set whether to change the display size and specific change rules.

In the case that the electronic whiteboard application and the rich-media file management application are displayed in the split-screen fashion via the electronic device, the user mainly uses the electronic whiteboard application for writing, and accessorily uses the rich-media file management application in the electronic device to display media files such as PPTs, pictures and videos. Thus, in the embodiment of the present disclosure, the area of the first window may be set to be larger than that of the second window, so as to ensure that the electronic device has sufficient writing space in the split-screen mode. Of course, the size ratio between the two windows in the split-screen mode may also be set to 1:1 (that is, the two windows have the same size), which is not limited in the embodiments of the present disclosure.

Optionally, the first window further displays a second control, wherein the second control is a layout exchange control. The electronic device may exchange the position of the first window with the position of the second window in response to a trigger operation on the second control. For example, as shown in FIG. 7, the sidebar 73 includes a layout exchange control 732. As another example, as shown in FIG. 8, the sidebar 83 includes a layout exchange control 832.

Optionally, the first window further displays a third control, wherein the third control is a full-screen control. The electronic device displays the application interface of the first application in a full-screen fashion in response to a trigger operation on the third control. That is, the electronic device may display the display interface as shown in FIG. 5 or 6. For example, as shown in FIG. 7, the sidebar 73 includes a full-screen control 733. For another example, as shown in FIG. 8, the sidebar 83 includes a full-screen control 833.

In the interfaces shown in FIGS. 7 and 8, the user can search and display media files by operating the rich-media file management application. The rich-media file management application is management software for various media files, and has functions such as reading system files, identifying and listing resource files, classified displaying, and reading and opening resource files. The media files that can be read and played by the rich-media file management application include text files, media files, picture files, video files, audio files, and the like. Herein, the text files include Word, Excel, PPT, PDF, and other types of files.

Optionally, the user can switch the file icons displayed in the second window (the application interface of the rich-media file management application) shown in FIG. 7 or 8 by swiping vertically or horizontally. For example, in the case that the user performs a gesture of swiping upward in the right window in FIG. 8, the file icons in the display region of the right window in FIG. 8 move upward as a whole, and the file icons above the screen disappear, and new file icons (for example, file G and file H) below the screen are displayed.

The embodiments of the present disclosure hereinafter describe the functions of the controls displayed in the first window in the split-screen mode.

The first control (the return control or the rollback control): it differs from the return controls 531 and 541 configured to undo the last operation on the electronic whiteboard application or return to the previous interface in the application interface of the electronic whiteboard application displayed in a full-screen fashion shown in FIG. 5 in that the first control displayed in the first window in the split-screen mode is always configured to undo the last operation of the user on the rich-media file management application displayed in the second window or return to the previous interface of the rich-media file management application.

In an example, in the case that the operation focus is on the rich-media file management application, in response to a trigger operation on the first control, the rich-media file management application in the electronic device receives a control instruction of the first control under the trigger operation, and directly executes the control instruction, namely, undoing the last operation or returning to the previous interface. If the operation focus is on the electronic whiteboard application, in response to the trigger operation on the first control, the electronic whiteboard application in the electronic device receives the control instruction of the first control under the trigger operation, and sends the control instruction to the rich-media file management application; and the rich-media file management application receives the control instruction, and executes the control instruction, namely, undoing the last operation or returning to the previous interface.

Optionally, the electronic whiteboard application sends the control instruction of the first control to the rich-media file management application by means of cross-process communication. Herein, the cross-process communication includes but is not limited to Android interface definition language (AIDL)-based communication, broadcast, Bundle and Intent.

In this example, the electronic whiteboard application is associated with the rich-media file management application by the first control. Thus, the control instruction of the first control can be always executed by the rich-media file management application by an application program layer and an application program framework layer without changing the kernel layer or the system library of the electronic device.

In another example, no matter whether the operation focus is on the rich-media file management application or the electronic whiteboard application, in response to the trigger operation on the first control, the rich-media file management application in the electronic device always receives the control instruction of the first control under the trigger operation, and executes the control instruction, namely, undoing the last operation or returning to the previous interface.

In this example, by changing the kernel layer and the system library of the electronic device, the first control in the split-screen mode is always associated with the rich-media file management application, such that the control instruction of the first control can be always executed by the rich-media file management application.

The second control (the layout exchange control): is configured to exchange the positions of two windows in the display interface. In some embodiments, when the user applies a touch operation (e.g., a touch and click by a finger) onto the layout exchange control 732 in the interface as shown in FIG. 7, the electronic device, in response to the touch operation on the layout exchange control 732, changes the layout in which the left window displays the rich-media file management application and the right window displays the electronic whiteboard application as shown in FIG. 7 to the layout in which the left window displays the electronic whiteboard application and the right window displays the rich-media file management application as shown in FIG. 8. Thus, the user can easily exchange the display positions of the two applications according to his/her needs. Optionally, the function of the layout exchange control may be implemented by modifying a window manager in the application framework layer, and only the display positions of the two applications are exchanged by calling a method.

The third control (the full-screen control): is configured to exit the split-screen mode, close the rich-media file management application, and enable the full-screen mode of the electronic whiteboard application to be returned back. In some embodiments, when the user applies a touch operation (e.g., a touch and click by a finger) onto the full-screen control 733 in the interface shown in FIG. 7, the electronic device closes the rich-media file management application in response to the touch operation on the full-screen control 733, and switches an interface in the split-screen mode shown in FIG. 7 to an interface in the full-screen mode shown in FIG. 5 or FIG. 6. It should be noted that the change of the interface does not affect the operation of the electronic whiteboard application. Switching from the split-screen mode to the full-screen mode can be understood as closing the rich-media file management application and its display window, and maximizing the display window of the electronic whiteboard application.

Optionally, the first interface further displays a fourth control, wherein the fourth control is a window adjusting control. In response to a drag operation on the fourth control, the electronic device adjusts a window size ratio of the first window to the second window.

Optionally, the fourth control is disposed between the first window and the second window. The fourth control may also be used as a window boundary control. For example, a window boundary control 74 disposed between the two windows is further displayed in the interface in the split-screen mode shown in FIG. 7. For another example, a window boundary control 84 disposed between the two windows is further displayed in the interface in the split-screen mode shown in FIG. 8. In the case that the user wants to change the sizes of the two windows, he/she can drag and touch the window boundary control. The electronic device adjusts the sizes of the two windows in response to the dragging and touch operation on the window boundary control. For example, dragging to the right increases the size of the left window but reduces the size of the right window. In this way, the user can conveniently adjust the sizes of the two windows according to his/her needs.

In process 403, in response to a manipulate operation triggered on the second application interface, the second application interface in the second window is switched to a third application interface, and the third application interface is displayed; wherein the third application interface belongs to the second application.

Optionally, the second application interface displays a play control for a media file. Process 403 is performed by switching the second application interface in the second window to the third application interface and displaying the third application interface in response to a trigger operation on the play control. Herein, the third application interface is a play interface corresponding to the media file.

Figure 9:
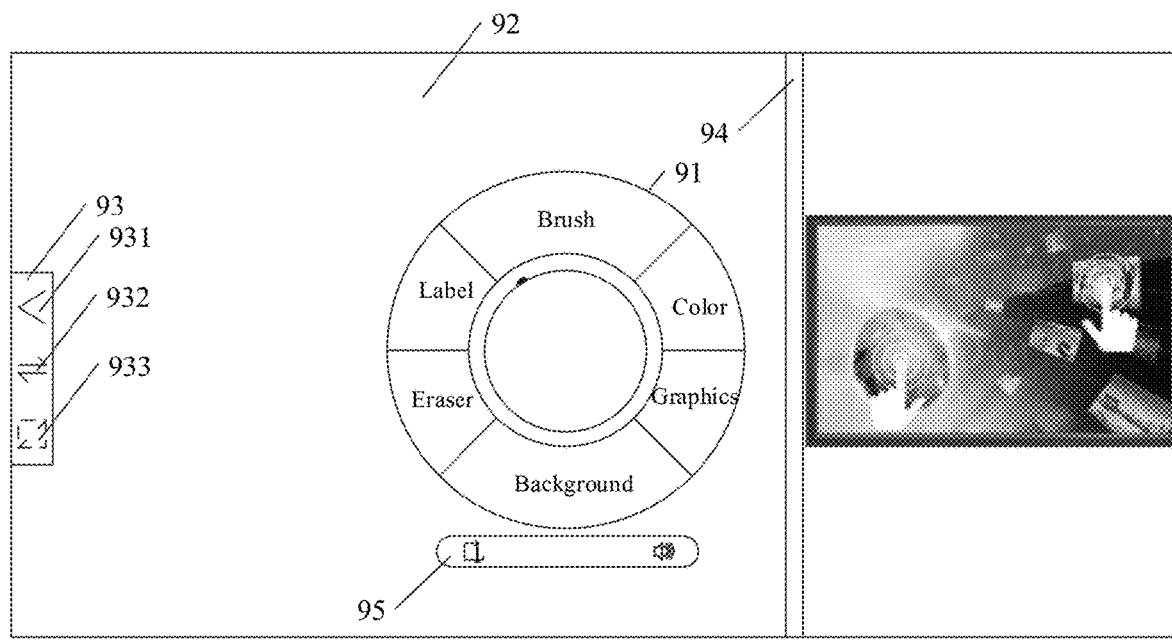
FIG. 9 is a schematic interface diagram of yet another first interface according to an embodiment of the present disclosure.

For example, file A shown in FIG. 8 is a video file, and an icon of file A is a play control for file A. When the user applies a touch operation (e.g., a touch and click by a finger) onto the icon of file A in the right window shown in FIG. 8, the electronic device displays an interface shown in FIG. 9 in response to the touch operation on the icon of the file A. FIG. 9 is a schematic interface diagram of yet another first interface according to an embodiment of the present disclosure. As shown in FIG. 9, the first interface includes a first window on the left side of the screen and a second window on the right side of the screen. The first window shown in FIG. 9 displays the application interface of the electronic whiteboard application and a sidebar 93. The application interface of the electronic whiteboard application shown in FIG. 9 includes a write set control 91 and a writing region 92. The second window shown in FIG. 9 displays a play interface of file A in the rich-media file management application. Herein, controls in the sidebar 93 and the controls in the sidebar 83 shown in FIG. 8 are the same and have the same function. The sidebar 93 includes a first control 931, a second control 932, and a third control 933.

Optionally, in response to a trigger operation on the play control, the electronic device may further display a play controlling control in the first window. The play controlling control is configured to control the media file played in the second window. For example, as shown in FIG. 9, the first window further displays a play controlling control 95. Herein, control keys of the play controlling control 95 include: a play/pause key, a next file key, a previous file key, a loop playback key, and/or a volume adjustment key.

Optionally, displaying the play controlling control across the windows is implemented as follows.

In response to the trigger operation on the play control, the rich-media file management application in the electronic device generates a status change message and sends the status change message to the electronic whiteboard application. Upon receiving the status change message, the electronic whiteboard application displays the play controlling control on the application interface. Optionally, the rich-media file management application sends the status change message to the electronic whiteboard application by means of cross-process communication. The cross-process communication includes but is not limited to the AIDL-based communication, broadcast, Bundle and Intent.

Optionally, controlling the play interface across the windows is implemented as follows.

In response to a trigger operation on a control key of the play controlling control, the electronic whiteboard application in the electronic device generates a play controlling instruction corresponding to the control key, and sends the play controlling instruction to the rich-media file management application. Upon receiving the play controlling instruction, the rich-media file management application executes a corresponding play controlling operation. Optionally, the electronic whiteboard application sends the play controlling instruction to the rich-media file management application by means of the cross-process communication. The cross-process communication includes but is not limited to the AIDL-based communication, broadcast, Bundle and Intent.

In the embodiment of the present disclosure, by displaying the play controlling control in the first window for controlling the media file played in the second window, the full-screen play of the media file in the second window can be realized, which is convenient for the user to watch. In addition, in the conference scene, a main speaker can manipulate in front of the first window the media file played in the second window, such that a playing screen of the second window can be prevented being blocked, thereby improving the user experience.

In process 404, in response to the trigger operation on the first control, the third application interface in the second window is switched to the second application interface, and the second application interface is displayed.

The electronic device switches the third application interface in the second window to the second application interface, and displays the second application interface. That is, the electronic device ends the play of the media file and returns to the second application interface displaying the play control of the media file. For example, when the user applies a touch operation (e.g., a touch and click by a finger) to the first control 931 in the first window shown in FIG. 9, the electronic device displays the interface shown in FIG. 8 in response to the touch operation on the first control 931.

It can be understood that in the two interfaces shown in FIGS. 8 and 9, the return control 831 in the sidebar 83 has the same function as the return control 931 in the sidebar 93, the layout exchange control 832 in the sidebar 83 has the same function as the layout exchange control 932 in the sidebar 93, and the full-screen control 833 in the sidebar 83 has the same function as the full-screen control 933 in the sidebar 93. In the five interfaces shown in FIG. 5 to FIG. 9, the functions of the write set controls 51, 61, 71, 81, and 91 are the same, and the functions of the writing regions 52, 62, 72, 82, and 92 are the same. In the three interfaces shown in FIG. 7 to FIG. 9, the functions of the window boundary controls 74, 84, and 94 are the same.

It should be noted that in the split-screen display method according to the embodiment of the present disclosure, the order of the processes may be appropriately adjusted, and the processes may be correspondingly increased or decreased as needed. Change methods which can be easily expected by any person skilled in the art within the technical scope disclosed by the present disclosure should be covered by the protection scope of the present disclosure, and thus will not be repeated herein.

In summary, in the split-screen display method according to the embodiments of the present disclosure, application interfaces of a plurality of applications can be displayed in a split-screen fashion on the electronic device, no matter which application the operation focus is on, the trigger operation on the first control always triggers the second application to execute a corresponding control instruction, such that a false response of the first application to the trigger operation on the first control can be avoided. Especially in a scene where some people operate the electronic device at the same time, it can avoid the false response caused by the confusion of the operation focus, such that the response accuracy of the electronic device can be improved, and the user experience can be further improved. In addition, the first control is displayed in the first window. The user can control the application displayed in the second window by the first control without switching the first window to the second window. Thus, by optimizing the interface layout, the user can operate conveniently. By displaying the play controlling control in the first window for controlling the media file played in the second window, the full-screen play of the media file in the second window can be realized, which brings convenience to the user during watching the screen. Especially in the conference scene, a main speaker can manipulate in front of the first window the media file played in the second window, such that a playing screen of the second window can be prevented being blocked, thereby improving the user experience.

Figure 10:
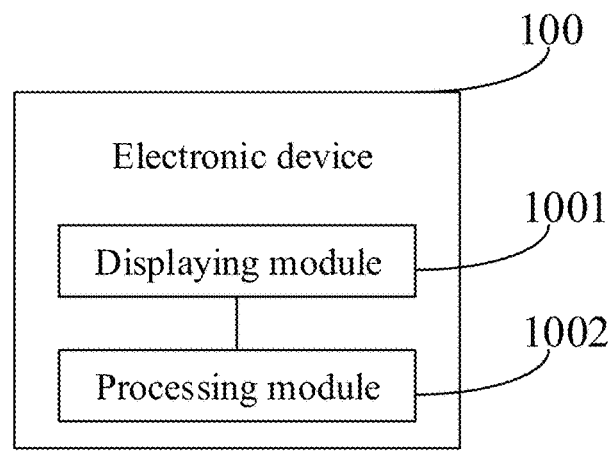
FIG. 10 is a schematic structural diagram of an electronic device according to an embodiment of the present disclosure.

FIG. 10 is a schematic structure diagram of an electronic device according to an embodiment of the present disclosure. As shown in FIG. 10, the electronic device 100 includes a display module 1001 and a processing module 1002.

The displaying module 1001 is configured to display a first interface, wherein the first interface includes a first window and a second window; wherein the first window displays a first application interface, the second window displays a second application interface, the first application interface belongs to a first application, and the second application interface belongs to a second application; and the first interface further displays a first control.

The processing module 1002 is configured to, execute, in response to a trigger operation on the first control, a control instruction triggered by the first control under the trigger operation via the second application.

Optionally, the processing module 1002 is further configured to control, in response to a manipulate operation triggered on the second application interface, the displaying module 1001 to switch the second application interface in the second window to a third application interface and display the third application interface, wherein the third application interface belongs to the second application. The processing module 1002 is further configured to control, in response to the trigger operation on the first control, the displaying module 1001 to switch the third application interface in the second window to the second application interface and display the second application interface.

Optionally, the second application interface displays a play control for a media file. The processing module 1002 is configured to control, in response to a trigger operation on the play control, the displaying module 1001 to switch the second application interface in the second window to the third application interface and display the third application interface, wherein the third application interface is a play interface corresponding to the media file.

Optionally, the displaying module 1001 is further configured to display a play controlling control in the first window in response to the trigger operation on the play control, wherein the play controlling control is configured to control the media file played in the second window.

Optionally, the first window further displays at least one of a second control, a third control, and a fourth control. The processing module 1001 is further configured to exchange the position of the first window with the position of the second window in response to a trigger operation on the second control. The displaying module 1001 is further configured to display an application interface of the first application in a full-screen fashion in response to a trigger operation on the third control. The processing module 1002 is further configured to adjust a window size ratio of the first window to the second window in response to a drag operation on the fourth control.

Optionally, the displaying module 1001 is further configured to display a second interface, wherein the second interface displays the first application interface and at least one fifth control. The processing module 1002 is further configured to control, in response to a trigger operation on the fifth control, the displaying module 1001 to switch the second interface to the first interface and display the first interface.

With respect to the device in the above embodiment, the specific ways for individual modules in the device to perform operations have been described in detail in the embodiments of the related methods, and are not be elaborated herein.

From the description of the above embodiment, those skilled in the art can clearly understand that for the convenience and brevity of the description, only the division of the above functional modules is taken as an example for explanation. In practice, the above functions may be assigned to the different functional modules to be achieved according to demands. That is, the internal structure of the device is divided into different functional modules to achieve all or part of the functions described above. Particular working processes of the system, device and modules described above may refer to corresponding processes in the foregoing method embodiments, and details are not repeated herein.

An electronic device is further provided according to an embodiment of the present disclosure. The electronic device includes a processor and a memory; wherein the memory is configured to store one or more computer programs including one or more program instructions therein; and the processor, when loading and running the one or more programs, is caused to perform the split-screen display method according to any one of the above embodiments.

Figure 11:
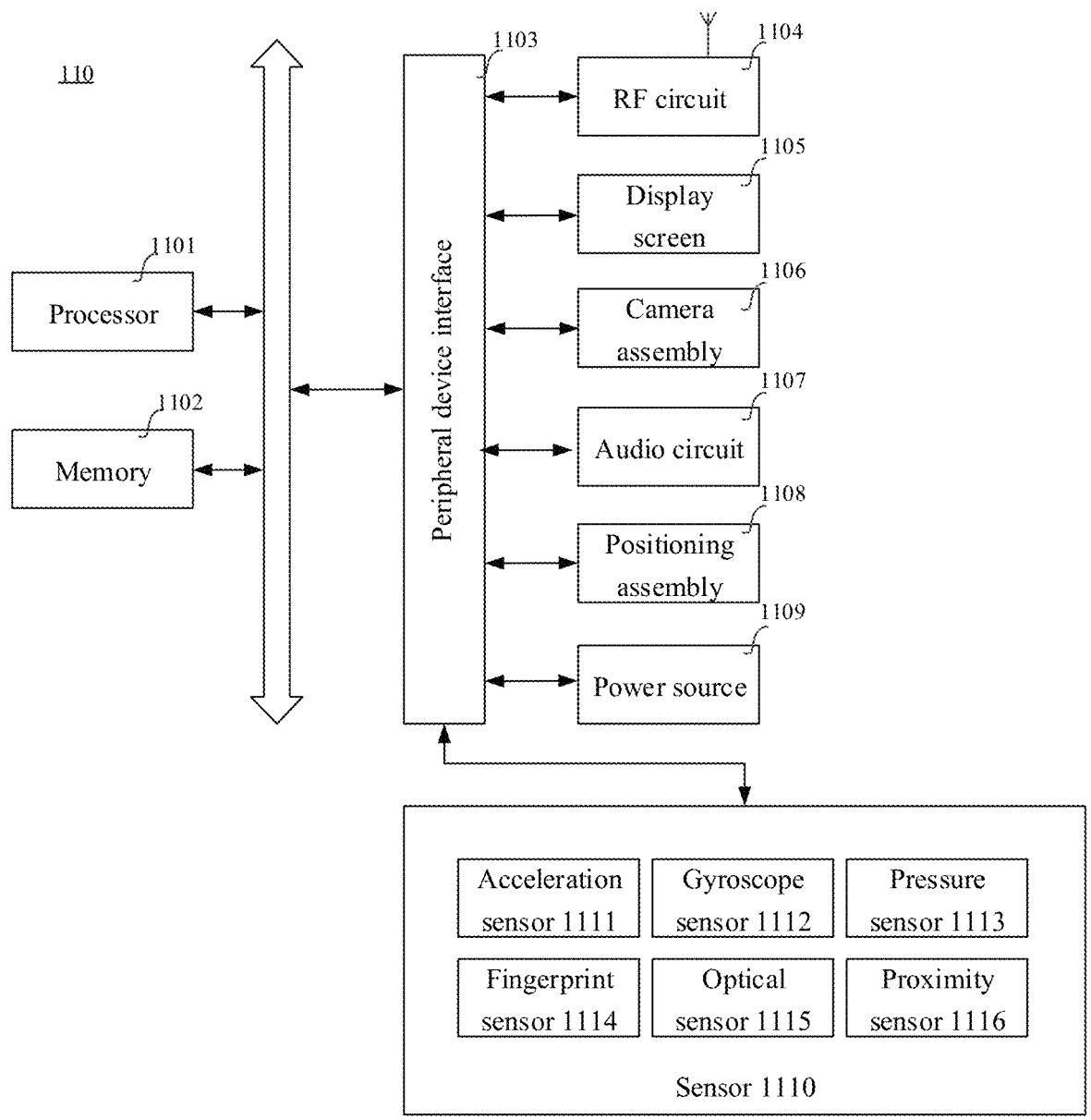
FIG. 11 is a block diagram of an electronic device according to an embodiment of the present disclosure.

For example, FIG. 11 is a block diagram of an electronic device according to an embodiment of the present disclosure. The electronic device may be an electronic whiteboard device with a display screen of 55 inches or more. The electronic device 110 may be a portable mobile terminal, such as a smart phone, a tablet computer, a Moving Picture Experts Group Audio Layer IV III (MP3) player, a Moving Picture Experts Group Audio Layer IV (MP4) player, a laptop or a desk computer. The electronic device 110 may also be referred to as a user device, a portable terminal, a laptop terminal, a desktop terminal, and the like.

Generally, the electronic device 110 includes a processor 1101 and a memory 1102.

The processor 1101 may include one or more processing cores, such as a 4-core processor and an 8-core processor. The processor 1101 may be practiced in any one of hardware forms of a digital signal processor (DSP), a field-programmable gate array (FPGA), and a programmable logic array (PLA). The processor 1101 may also include a main processor and a coprocessor. The main processor is a processor for processing the data in an awake state, and is also called a central processing unit (CPU). The coprocessor is a low-power-consumption processor for processing the data in a standby state. In some embodiments, the processor 1101 may be integrated with a graphics processing unit (GPU) which is responsible for rendering and drawing of content required to be displayed by a display. In some embodiments, the processor 1101 may also include an Artificial Intelligence (AI) processor configured to process computational operations related to machine learning.

The memory 1102 may include one or more computer-readable storage media, which may be non-transitory. The memory 1102 may further include a high-speed random-access memory, as well as a non-volatile memory, such as one or more disk storage devices and flash storage devices. In some embodiments, the non-transitory computer-readable storage medium in the memory 1102 is configured to store at least one instruction which is executable by the processor 1101 to implement the split-screen display method according to the embodiments of the present disclosure.

In some embodiments, the electronic device 110 may further include: a peripheral device interface 1103 and at least one peripheral device. The processor 1101, the memory 1102, and the peripheral device interface 1103 may be connected by a bus or a signal line. Each peripheral device may be connected to the peripheral device interface 1103 by a bus, a signal line, or a circuit board. Specifically, the peripheral device includes at least one of a radio frequency circuit 1104, a display screen 1105, a camera 1106, an audio circuit 1107, a positioning assembly 1108, and a power source 1109.

The peripheral device interface 1103 may be configured to connect at least one peripheral device associated with an input/output (I/O) to the processor 1101 and the memory 1102. In some embodiments, the processor 1101, the memory 1102 and the peripheral device interface 1103 are integrated on the same chip or circuit board. In some other embodiments, any one or two of the processor 1101, the memory 1102, and the peripheral device interface 1103 may be practiced on a separate chip or circuit board, which is not limited in this embodiment.

The radio frequency circuit 1104 is configured to receive and transmit a radio frequency (RF) signal, which is also referred to as an electromagnetic signal. The radio frequency circuit 1104 communicates with a communication network and other communication devices via the electromagnetic signal. The radio frequency circuit 1104 converts an electrical signal into the electromagnetic signal for transmission, or converts the received electromagnetic signal into the electrical signal. Optionally, the radio frequency circuit 1104 includes: an antenna system, an RF transceiver, one or more amplifiers, a tuner, an oscillator, a digital signal processor, a coding and decoding chipset, a user identity module card, and the like. The radio frequency circuit 1104 may communicate with other terminals by at least one wireless communication protocol. The wireless communication protocol includes but is not limited to World Wide Web, a metropolitan area network, intranet, various generations of mobile communication networks (2G, 3G, 4G, and 5G), a wireless local area network, and/or a WiFi (Wireless Fidelity) network. In some embodiments, the radio frequency circuit 1104 may also include a near field communication (NFC)-related circuit, which is not limited in the present disclosure.

The display screen 1105 is configured to display a user interface (UI). The UI may include graphics, texts, icons, videos, and any combination thereof. When the display screen 1105 is a touch display screen, the display screen 1105 also has the capacity to acquire touch signals on or over the surface of the display screen 1105. The touch signal may be input into the processor 1101 as a control signal for processing. At this time, the display screen 1105 may also be configured to provide virtual buttons and/or virtual keyboards, which are also referred to as soft buttons and/or soft keyboards. In some embodiments, one display screen 1105 may be disposed on the front panel of the electronic device 110. In some other embodiments, at least two display screens 1105 may be disposed respectively on different surfaces of the electronic device 110 or in a folded design. In further embodiments, the display screen 1105 may be a flexible display screen disposed on the curved or folded surface of the electronic device 110. Even the display screen 1105 may have an irregular shape other than a rectangle; that is, the display screen 605 may be an irregular-shaped screen. The display screen 1105 may be an OLED display screen.

The camera assembly 1106 is configured to capture images or videos. Optionally, the camera assembly 1106 includes a front camera and a rear camera. Usually, the front camera is disposed on the front panel of the terminal 1300, and the rear camera is disposed on the back of the terminal 1300. In some embodiments, at least two rear cameras are arranged and are respectively any one type of a main camera, a depth camera, a wide-angle camera, and a telephoto camera, so as to realize the background blur function realized by fusion of the main camera and the depth camera, the panoramic shooting and virtual reality (VR) shooting realized by fusion of the main camera and the wide-angle camera, or other fused shooting functions. In some embodiments, the camera assembly 1106 may further include a flashlight. The flashlight may be a mono-color temperature flashlight or a two-color temperature flashlight. The two-color temperature flashlight is a combination of a warm flashlight and a cold flashlight, and may be used for light compensation at different color temperatures.

The audio circuit 1107 may include a microphone and a speaker. The microphone is configured to acquire sound waves of users and environments, and convert the sound waves into electrical signals which are input into the processor 1101 for processing, or input into the radio frequency circuit 1104 for voice communication. For the purpose of stereo acquisition or noise reduction, there may be a plurality of microphones respectively disposed at different locations of the electronic device 110. The microphone may also be an array microphone or an omnidirectional acquisition microphone. The speaker is then configured to convert the electrical signals from the processor 1101 or the RF circuit 1104 into the sound waves. The speaker may be a conventional film speaker or a piezoelectric ceramic speaker. In the case that the speaker is the piezoelectric ceramic speaker, the electrical signal can be converted into not only human-audible sound waves but also the sound waves which are inaudible to humans for the purpose of ranging and the like. In some embodiments, the audio circuit 1107 may also include a headphone jack.

The positioning assembly 1108 is configured to position the current geographic location of the electronic device 110 to implement navigation or a location based service (LBS). The positioning assembly 1108 may be a positioning assembly based on the United States' global positioning system (GPS), China's BeiDou navigation satellite system (BDS), or Russia's global navigation satellite system (GLONASS).

The power source 1109 is configured to power up various assemblies in the electronic device 110. The power source 1109 may be an alternating current power source, a direct current power source, a disposable battery, or a rechargeable battery. In the case that the power source 1109 includes the rechargeable battery, the rechargeable battery may be a wired rechargeable battery or a wireless rechargeable battery. The wired rechargeable battery is a battery charged via a wired line, and the wireless rechargeable battery is a battery charged via a wireless coil. The rechargeable battery may also support the fast charging technology.

In some embodiments, the electronic device 110 further includes one or more sensors 1110. The one or more sensors 1110 include, but are not limited to, an acceleration sensor 1111, a gyro sensor 1112, a pressure sensor 1113, a fingerprint sensor 1114, an optical sensor 1115, and a proximity sensor 1116.

The acceleration sensor 1111 is configured to detect magnitudes of accelerations on three coordinate axes of a coordinate system established by the electronic device 110. For example, the acceleration sensor 1111 may be configured to detect components of a gravitational acceleration on the three coordinate axes. The processor 1101 may control the touch display screen 1105 to display a user interface in a landscape view or a portrait view based on a gravity acceleration signal captured by the acceleration sensor 1111. The acceleration sensor 1111 may also be configured to acquired motion data of a game or a user.

The gyro sensor 1112 is configured to detect a body direction and a rotation angle of the electronic device 110, and may cooperate with the acceleration sensor 1111 to capture a 3D motion of the user on the electronic device 110. Based on the data captured by the gyro sensor 1112, the processor 1101 can serve the following functions: motion sensing (such as changing the UI based on a user's tilt operation), image stabilization during shooting, game control and inertial navigation.

The pressure sensor 1113 may be arranged on a side frame of the electronic device 110 and/or a lower layer of the touch display screen 1105. In the case that the pressure sensor 1113 is disposed on the side frame of the electronic device 110, a user's holding signal to the electronic device 110 can be detected. The processor 1101 can perform left-right hand recognition or quick operation based on the holding signal capture by the pressure sensor 1113. In the case that the pressure sensor 1113 is disposed on the lower layer of the touch display screen 1105, the processor 1101 controls an operable control on the UI based on a user's pressure operation on the touch display screen 1105. The operable control includes at least one of a button control, a scroll bar control, an icon control and a menu control.

The fingerprint sensor 1114 is configured to capture a user's fingerprint. The processor 1101 identifies the user's identity based on the fingerprint captured by the fingerprint sensor 1114, or the fingerprint sensor 1114 identifies the user's identity based on the captured fingerprint. In the case that the user's identity is identified as trusted, the processor 1101 authorizes the user to perform related sensitive operations, such as unlocking the screen, viewing encrypted information, downloading software, paying, and changing settings. The fingerprint sensor 1114 may be provided on the front, back or side of the electronic device 110. In the case that the electronic device 110 is provided with a physical button or a manufacturer's logo, the fingerprint sensor 1114 may be integrated with a physical button or the manufacturer's logo.

The optical sensor 1115 is configured to capture ambient light intensity. In one embodiment, the processor 1101 may control the display luminance of the touch display screen 1105 based on the ambient light intensity captured by the optical sensor 1115. Specifically, when the ambient light intensity is relatively high, the display brightness of the touch display screen 1105 is raised. When the ambient light intensity is relatively low, the display brightness of the touch display screen 1105 is lowered. In another embodiment, the processor 1101 may also dynamically adjust the shooting parameters of the camera assembly 1106 based on the ambient light intensity captured by the optical sensor 1115.

The proximity sensor 1116, also referred to as a distance sensor, is usually disposed on the front panel of the electronic device 110. The proximity sensor 1116 is configured to capture a distance between the user and a front surface of the electronic device 110. In one embodiment, when the proximity sensor 1116 detects that the distance between the user and the front surface of the electronic device 110 gradually decreases, the processor 1101 controls the display screen 1105 to switch from a screen-on state to a screen-off state. When the proximity sensor 1116 detects that the distance between the user and the front surface of the electronic device 110 gradually increases, the processor 1101 controls the display screen 1105 to switch from the screen-off state to the screen-on state.

It will be understood by those skilled in the art that the structure shown in FIG. 11 does not constitute a limitation to the electronic device 110. The electronic device 110 may include more or fewer components than those illustrated, or combine some components or adopt different component arrangements.

An embodiment of the present disclosure further provides a computer-readable storage medium storing one or more instructions therein; wherein the one or more instructions, when loaded and executed by a processor of an electronic device, causes the electronic device to perform the split-screen display method according to any one of the above embodiments.

It may be understood that to implement the above functions, the electronic device includes corresponding hardware structures and/or software modules for executing various functions. Those skilled in the art should recognize that respective exemplary units and algorithm steps described in conjunction with the embodiments disclosed in the present disclosure may be implemented as hardware or a combination of hardware and computer software according to the embodiments of the present disclosure. Whether a function is implemented in the mode of hardware or in the mode that computer software drives the hardware depends on particular applications and design constraints of the technical solutions. Those skilled in the art may implement the described functions with different methods for each of particular applications, but such implementation shall not be regarded as going beyond the scope of the embodiments of the present disclosure.

The embodiments of the present disclosure may perform division of the functional modules on the above electronic device according to the above method examples. For example, respectively functional modules may be divided corresponding to respective functions, or two or more functions may be integrated into one processing module. The above integrated modules may be implemented in the form of hardware or software functional modules. It should be noted that the division of the modules in the embodiments of the present disclosure is illustrative, and is only a logical function division, and there may be other division modes in actual implementation.

In addition, all functional units in respective embodiments of the present disclosure may be integrated into one processing unit. Optionally, each unit exists physically independently. Optionally, two or more units may be integrated into one unit. The above integrated units may be implemented in the form of hardware or a software functional unit.

The integrated units, if implemented in the form of the software functional unit and sold or used as a standalone product, may be stored in a computer-readable storage medium. Based on such understanding, the technical solutions of the embodiments of the present disclosure in essence, or a part that contributes to the prior art, or all or part of the technical solutions, may be embodied in the form of a software product. The computer software product is stored in a storage medium and includes a plurality of instructions for a computer device (which may be a personal computer, a server, a network device or the like) or a processor to execute all or part of the processes of the method described in respective embodiments of the present disclosure. The foregoing storage medium includes a flash memory, a mobile hard disk, a read-only memory, a random-access memory, a magnetic disk, an optical disk or other various mediums that may store program codes.

Obviously, the above embodiments of the present disclosure are merely examples to clearly illustrate the present disclosure, and are not intended to limit the implementations of the present disclosure. For those of ordinary skilled in the art, on the basis of the above illustration, other different forms of changes or variations can also be made, and it is not possible to list all the implementations herein. Any obvious changes or variations derived from the technical solutions of the present disclosure are still within the scope of protection of the present disclosure.

What is claimed is:

1. A split-screen display method, applicable to an electronic device, the method comprising:
   displaying a first interface on a touch screen, wherein the first interface displays a first application interface of an electronic whiteboard application as a first application in a full-screen fashion and a plurality of controls associated with operations on the electronic whiteboard application;
   in response to a touch input on a split-screen control among the plurality of controls, switching the first interface to a split-screen mode comprising a first window and a second window, the first window displaying the first application interface of the electronic whiteboard application and the second window displaying a second application interface of a rich-media file management application as a second application, wherein the second application displays file icons as play controls for corresponding media files, and the rich-media file management application is an application configured for searching, opening, and playing various media file resources;
   in response to a touch input on a first control among the plurality of controls displayed on the first window, receiving a control instruction triggered by the first control and sending the control instruction to the rich-media file management application, and the rich-media file management application receiving the control instruction and executing the control instruction, wherein the first control in the split-screen mode is associated with the second application;
   in response to a touch input on one of the file icons on the second application interface, displaying an application interface for the selected media file belonging to the second application as a third application interface in the second window; and
   in response to a touch input on the play control of the file icon on the third application interface, displaying a play controlling control in the first window, the play controlling control being configured to control the media file being played in the second window.

2. The method according to claim 1, wherein the first window further displays a second control; and the method further comprises:
   exchanging a position of the first window with a position of the second window in response to a trigger operation on the second control.

3. The method according to claim 1, wherein the first window further displays a third control; and the method further comprises:
   displaying an application interface of the first application in a full-screen fashion in response to a trigger operation on the third control.

4. The method according to claim 1, wherein the first window further displays a fourth control; and the method further comprises:
   adjusting a window size ratio of the first window to the second window in response to a drag operation on the fourth control.

5. The method according to claim 4, wherein the fourth control is disposed between the first window and the second window.

6. The method according to claim 1, wherein prior to displaying the first interface, the method further comprises:
   displaying a second interface, the second interface displaying the first application interface and at least one fifth control; and
   displaying the first interface comprises:
   switching, in response to a trigger operation on the fifth control, the second interface to the first interface and displaying the first interface.

7. The method according to claim 6, wherein the fifth control displayed on the second interface comprises at least one of: a fifth control displayed in a left region of the second interface, a fifth control displayed in a right region of the second interface, a fifth control displayed in an upper region of the second interface, and a fifth control displayed in a lower region of the second interface; and
   in the case that the trigger operation on the fifth control is a trigger operation on the fifth control displayed in the left region of the second interface, the second window in the first interface is disposed on the left side of the first window; or
   in the case that the trigger operation on the fifth control is a trigger operation on the fifth control displayed in the right region of the second interface, the second window in the first interface is disposed on the right side of the first window; or
   in the case that the trigger operation on the fifth control is a trigger operation on the fifth control displayed in the upper region of the second interface, the second window in the first interface is disposed on the upper side of the first window; or in the case that the trigger operation on the fifth control is a trigger operation on the fifth control displayed in the lower region of the second interface, the second window in the first interface is disposed on the lower side of the first window.

8. An electronic device, comprising: a processor and a memory; wherein
the memory is configured to store one or more computer programs comprising one or more program instructions therein; and
the processor, when loading and running the one or more computer programs, is caused to perform:
displaying a first interface on a touch screen, wherein the first interface displays a first application interface of an electronic whiteboard application as a first application in a full-screen fashion and a plurality of controls associated with operations on the electronic whiteboard application;
in response to a touch input on a split-screen control among the plurality of controls, switching the first interface to a split-screen mode comprising a first window and a second window, the first window displaying the first application interface of the electronic whiteboard application and the second window displaying a second application interface of a rich-media file management application as a second application, wherein the second application displays file icons as play controls for corresponding media files, and the rich-media file management application is an application configured for searching, opening, and playing various media file resources;
in response to a touch input on a first control among the plurality of controls displayed on the first window, receiving a control instruction triggered by the first control and sending the control instruction to the rich-media file management application, and the rich-media file management application receiving the control instruction and executing the control instruction, wherein the first control in the split-screen mode is associated with the second application;
in response to a touch input on one of the file icons on the second application interface, displaying an application interface for the selected media file belonging to the second application as a third application interface in the second window; and
in response to a touch input on the play control of the file icon on the third application interface, displaying a play controlling control in the first window, the play controlling control being configured to control the media file being played in the second window.

9. A non-transitory computer-readable storage medium storing one or more instructions therein, wherein the one or more instructions, when loaded and executed by a processor of an electronic device, cause the electronic device to perform:
displaying a first interface on a touch screen, wherein the first interface displays a first application interface of an electronic whiteboard application as a first application in a full-screen fashion and a plurality of controls associated with operations on the electronic whiteboard application;
in response to a touch input on a split-screen control among the plurality of controls, switching the first interface to a split-screen mode comprising a first window and a second window, the first window displaying the first application interface of the electronic whiteboard application and the second window displaying a second application interface of a rich-media file management application as a second application, wherein the second application displays file icons as play controls for corresponding media files, and the rich-media file management application is an application configured for searching, opening, and playing various media file resources;
in response to a touch input on a first control among the plurality of controls displayed on the first window, receiving a control instruction triggered by the first control and sending the control instruction to the rich-media file management application, and the rich-media file management application receiving the control instruction and executing the control instruction, wherein the first control in the split-screen mode is associated with the second application;
in response to a touch input on one of the file icons on the second application interface, displaying an application interface for the selected media file belonging to the second application as a third application interface in the second window; and
in response to a touch input on the play control of the file icon on the third application interface, displaying a play controlling control in the first window, the play controlling control being configured to control the media file being played in the second window.

10. The electronic device according to claim 8, wherein the first window further displays a second control; and the processor, when loading and running the one or more computer program, is further caused to perform:
exchanging a position of the first window with a position of the second window in response to a trigger operation on the second control.

* * * * *

UNITED STATES PATENT AND TRADEMARK OFFICE
CERTIFICATE OF CORRECTION

PATENT NO. : 11,797,145 B2  
APPLICATION NO. : 17/772963  
DATED : July 18, 2023  
INVENTOR(S) : Zhenyan Zhao et al.

It is certified that error appears in the above-identified patent and that said Letters Patent is hereby corrected as shown below:

On the Title Page

Item (30) The country of foreign priority should be CN.

Signed and Sealed this  
Fifth Day of December, 2023

Katherine Kelly Vidal  
*Director of the United States Patent and Trademark Office*